(12) United States Patent
Joos et al.

(10) Patent No.: US 9,005,825 B2
(45) Date of Patent: Apr. 14, 2015

(54) BUS BAR ASSEMBLY FOR AN ELECTROCHEMICAL CELL STACK

(75) Inventors: Nathaniel Ian Joos, Toronto (CA); Mario Dzamarija, Toronto (CA)

(73) Assignee: Hydrogenics Corporation, Mississauga (CA)

( * ) Notice: Subject to any disclaimer, the term of this patent is extended or adjusted under 35 U.S.C. 154(b) by 1170 days.

(21) Appl. No.: 11/937,885

(22) Filed: Nov. 9, 2007

(65) Prior Publication Data

US 2008/0113250 A1 May 15, 2008

Related U.S. Application Data

(60) Provisional application No. 60/865,292, filed on Nov. 10, 2006.

(51) Int. Cl.
*H01M 8/02* (2006.01)
*H01M 8/24* (2006.01)
*H01M 8/10* (2006.01)

(52) U.S. Cl.
CPC ...... *H01M 8/248* (2013.01); *H01M 2008/1095* (2013.01); *Y02E 60/50* (2013.01)

(58) Field of Classification Search
USPC .......................................................... 429/35
See application file for complete search history.

(56) References Cited

U.S. PATENT DOCUMENTS

| 5,176,966 | A | 1/1993 | Epp et al. | |
|---|---|---|---|---|
| 5,547,777 | A * | 8/1996 | Richards | 429/437 |
| 5,912,088 | A | 6/1999 | Ernst | |
| 6,080,503 | A | 6/2000 | Schmid et al. | |
| 6,426,159 | B1 | 7/2002 | Kralick | |
| 2004/0131905 | A1* | 7/2004 | Enjoji et al. | 429/26 |
| 2005/0095491 | A1 | 5/2005 | Tarver et al. | |
| 2005/0186462 | A1* | 8/2005 | Belanger et al. | 429/34 |
| 2007/0117005 | A1* | 5/2007 | Fuglevand et al. | 429/40 |

FOREIGN PATENT DOCUMENTS

| CA | 2460241 A1 | | 3/2003 |
|---|---|---|---|
| WO | WO 2005/041332 | * | 5/2005 |
| WO | 2007/087260 A2 | | 8/2007 |

* cited by examiner

*Primary Examiner* — Alix Eggerding
(74) *Attorney, Agent, or Firm* — Scott Pundsack; Borden Ladner Gervais LLP

(57) ABSTRACT

An electrochemical cell stack assembly is disclosed comprising a member made of an elastic and electrically conductive material placed between a bus bar and a starter plate. The elastic, electrically conducting member covers at least a peripheral region along a perimeter of a recess housing the bus bar to distribute compression forces over an interface area between the bus bar and an insulator end plate, thereby reducing shear stresses in the starter plate when the stack is compressed. An elastic pad also may be arranged in the recess and between the insulator end plate and the bus bar.

15 Claims, 16 Drawing Sheets

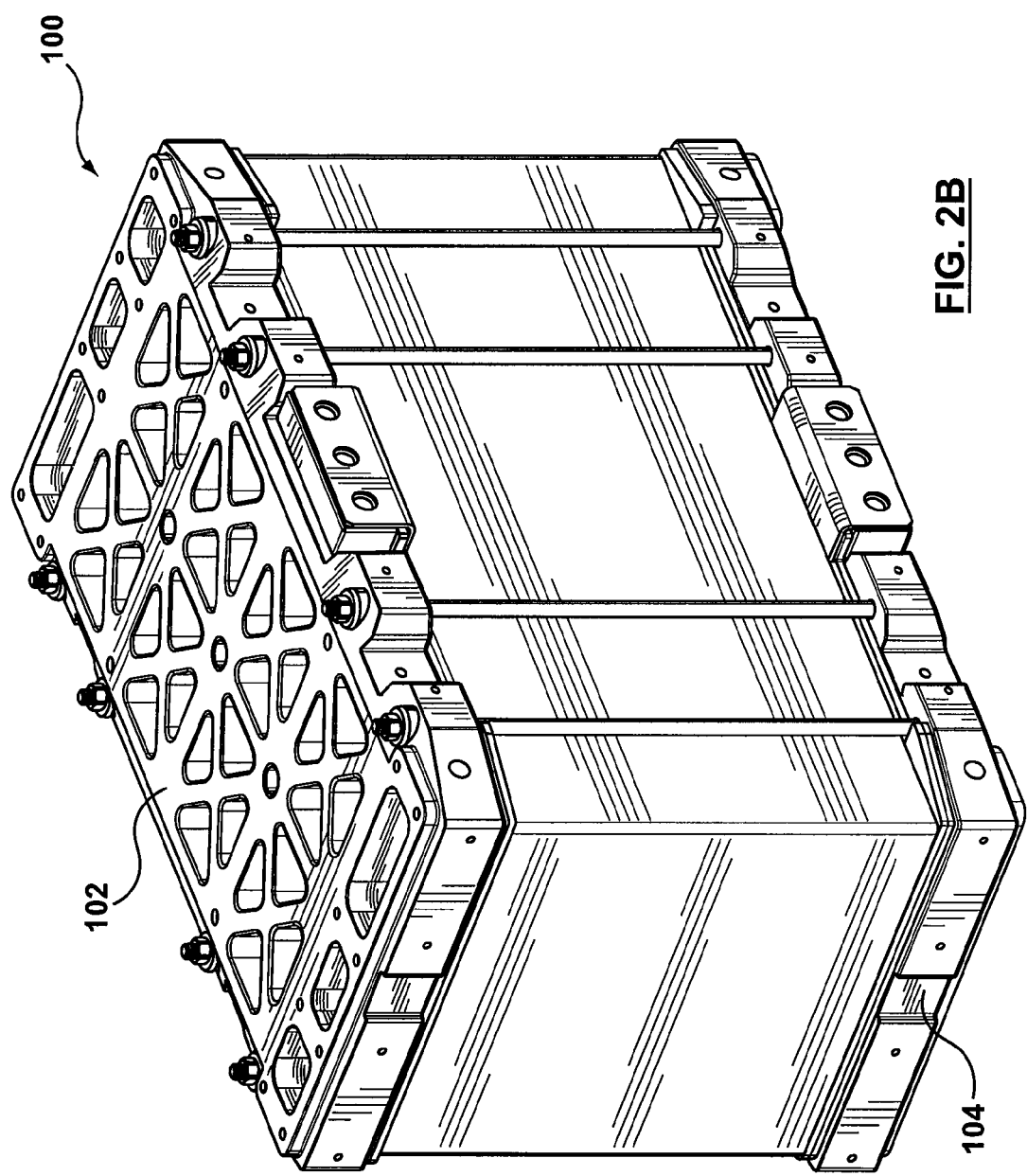

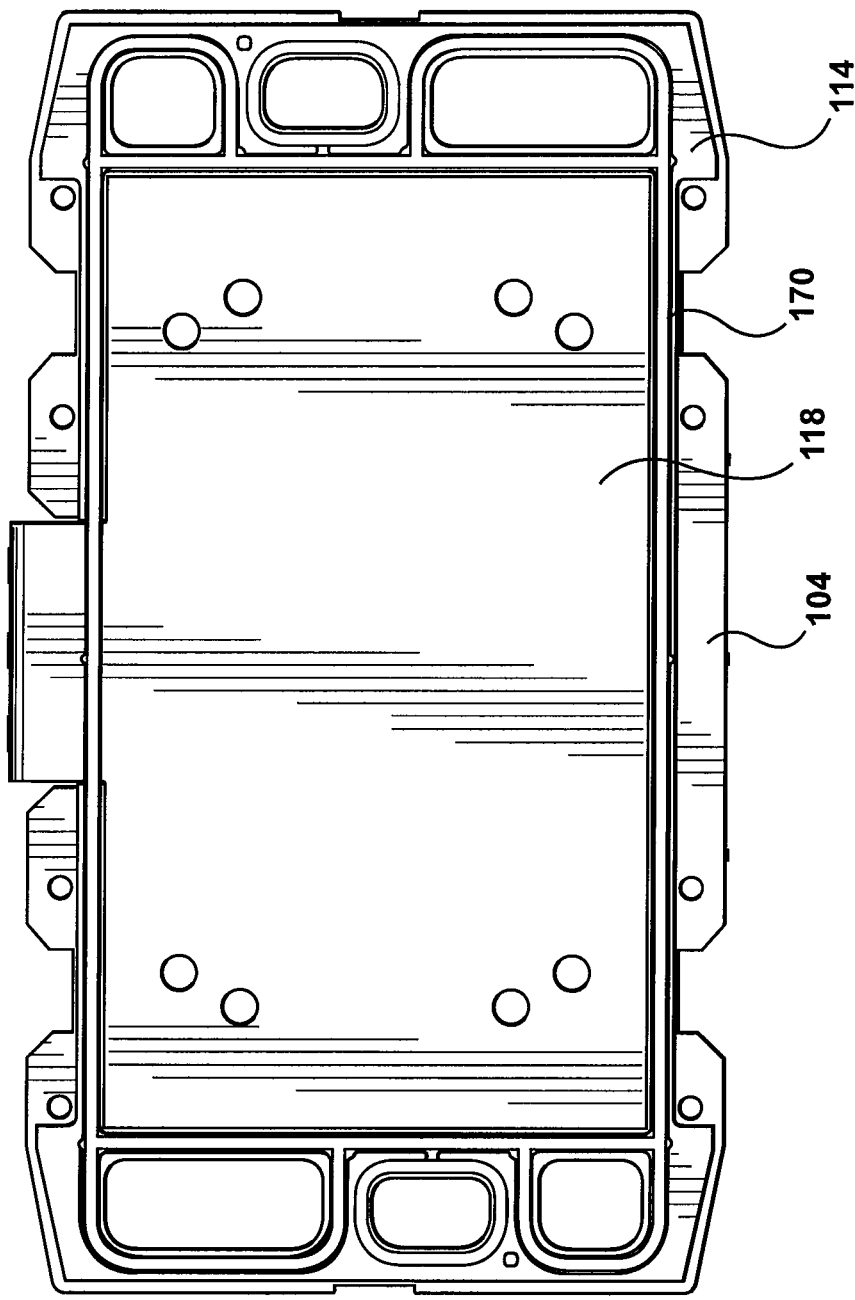

BUS BAR ASSEMBLY FOR AN ELECTROCHEMICAL CELL STACK

PRIORITY

This application claims the benefit of U.S. Patent Application No. 60/865,292, filed Nov. 10, 2006.

FIELD

This invention relates to an arrangement for a bus bar for an electrochemical cell stack, and more particularly relates to a sealing and force distribution means for the bus bar.

BACKGROUND

The following paragraphs are not an admission that anything discussed in them is prior art or part of the knowledge of persons skilled in the art.

Fuel cells have been proposed as a clean, efficient and environmentally friendly source of power that can be utilized for various applications. A fuel cell is an electrochemical device that produces an electromotive force by bringing the fuel (typically hydrogen) and an oxidant (typically air) into contact with two suitable electrodes and an electrolyte. A fuel, such as hydrogen gas, for example, is introduced at a first electrode (anode) where it reacts electrochemically in the presence of the electrolyte to produce electrons and cations. The electrons are conducted from the anode to a second electrode (cathode) through an electrical circuit connected between the electrodes. Cations pass through the electrolyte to the cathode. Simultaneously, an oxidant, such as oxygen gas or air is introduced to the cathode where the oxidant reacts electrochemically in presence of the electrolyte and catalyst, producing anions and consuming the electrons circulated through the electrical circuit; the cations are consumed at the cathode. The anions formed at the cathode react with the cations to form a reaction product. The anode may alternatively be referred to as a fuel or oxidizing electrode and the cathode may alternatively be referred to as an oxidant or reducing electrode. The half-cell reactions at the two electrodes are, respectively, as follows:

$$H_2 \rightarrow 2H^+ + 2e^- \quad (1)$$

$$\tfrac{1}{2}O_2 + 2H^+ + 2e^- \rightarrow H_2O \quad (2)$$

The external electrical circuit withdraws electrical current and thus receives electrical power from the fuel cell. The overall fuel cell reaction produces electrical energy as shown by the sum of the separate half-cell reactions written above. Water and heat are typical by-products of the reaction. Accordingly, the use of fuel cells in power generation offers potential environmental benefits compared with power generation from combustion of fossil fuels or by nuclear activity. Some examples of applications are distributed residential power generation and automotive power systems to reduce emission levels.

In practice, fuel cells are not operated as single units. Rather, fuel cells are connected in series, stacked one on top of the other, or placed side by side. A series of fuel cells, referred to as fuel cell stack, is normally enclosed in a housing. The fuel and oxidant are directed through manifolds to the electrodes, while cooling is provided either by the reactants or by a separate cooling medium. Also within the stack are current collectors, cell-to-cell seals and insulation. Piping and various instruments are externally connected to the fuel cell stack for supplying and controlling the fluid streams in the system. The stack, housing, and associated hardware make up the fuel cell unit.

There are various known types of fuel cells. For example, proton exchange membrane (PEM) fuel cells are one of the most promising replacements for traditional power generation systems, as a PEM fuel cell enables a simple, compact fuel cell to be designed, which is robust and which can be operated at temperatures not too different from ambient temperatures. Usually, PEM fuel cells are fuelled by pure hydrogen gas, as it is electrochemically reactive and the by-products of the reaction are water and heat, which is environmentally friendly. A conventional PEM fuel cell usually comprises two flow filed plates (bipolar plates), namely, an anode flow field plate and a cathode flow field plate, with a proton exchange membrane (MEA) disposed there between. The MEA includes the actual proton exchange membrane and layers of catalyst for fuel cell reaction coated onto the membrane. Additionally, a gas diffusion media (GDM) or gas diffusion layer (GDL) is provided between each flow field plate and the PEM. The GDM or GDL facilitates the diffusion of the reactant gas, either the fuel or oxidant, to the catalyst surface of the MEA while provides electrical conductivity between each flow field plate and the PEM.

Each flow field plate typically has three apertures or openings at each end, each aperture representing either an inlet or outlet for one of fuel, oxidant and coolant. However, it is possible to have multiple inlets and outlets on flow field plates for each reactant gas or coolant, depending on the fuel cell or stack design. When a fuel cell stacked in assembled, the anode flow field plate of one cell abuts against the cathode flow field plate of an adjacent cell. These apertures extend throughout the thickness of the flow field plates and align to form elongate distribution channels extending perpendicular to the flow field plates and through the entire fuel cell stack when the flow field plates stack together to form a complete fuel cell stack. A flow field usually comprises at least one, and in most cases a plurality of, open-faced flow channels that fluidly communicate (connect) appropriate inlet and outlet. As a reactant gas flows through the channels, it diffuses through GDM and reacts on the MEA in the presence of catalyst. A continuous flow through ensures that, while most of the fuel or oxidant is consumed, any contaminant are continually flushed through the fuel cell. The flow field may be provided on either face or both faces of the flow field plate. Typically, fuel or oxidant flow fields are formed respectively on the face of the anode and cathode flow field plate that faces toward the MEA (hereinafter, referred to as "front face"). A coolant flow field may be provided on either the face of either of anode or cathode flow field plate that faces away from the MEA (hereinafter, referred to as "rear face").

When a complete fuel cell stack is formed, a pair of current collector plates (bus bars) are provided immediately adjacent the outmost flow field plates (starter plates), one on each side of the stack, to collect current from the fuel cell stack and supply the current to an external electrical circuit. A pair of insulator plates is provided immediately outside of the current collector plates followed by a pair of end plates located immediately outside the insulator. Alternatively, an end plate may be utilized, which has an electrically insulating coating on the outer surface or the endplate may be manufactured using an electrically insulating material. A seal is provided between each pair of adjacent plates. The seal is usually in the form of gaskets made of resilient materials that are compatible with the fuel cell environment. A fuel cell stack, after assembly, is commonly clamped to secure the elements and ensure that adequate compression is applied to the seals and active areas of the fuel cell stack. This method ensures that the contact resistance is minimized and the electrical resistance of the cells is at a minimum.

For the purposes of this patent application, the term "insulator end plate" is used to describe either a first alternative having a combination of an insulator plate and end plate, or a second alternative having an end plate manufactured with electrically insulating material or coated on the outer surface with an electrically insulating layer.

The bus bar is arranged in a recess or pocket provided in the insulator plate, for the first alternative of an insulator end plate, or in the end plate itself, for the second alternative.

The depth of the recess is ideally slightly smaller than the thickness of the bus bar, so that when the bus bar is placed in the recess, the bus bar protrudes a certain distance from the flat side of the insulator plate/end plate to ensure good contact between bus bar and starter plate (first flow field plate of the stack). If the recess is deeper than the thickness of the bus bar, the bus bar will not be pressed against the starter plate and, thus, the electrical contact between the bus bar and the starter plate will be poor. In this situation, an elastic member may be inserted between the recess and the bus bar, to press the bus bar towards the starter plate.

It can be appreciated from the previous discussion that a problem in conventional fuel cell is that the amount of bus bar protruding from the recess cannot be too great. If the bus bar protrudes too much, the adjacent flow field plates may crack from the shear stresses created when the stack is compressed.

SUMMARY

The following introduction is intended to introduce the reader to this specification but not to define any invention. One or more inventions may reside in a combination or subcombination of the apparatus elements or method steps described below or in other parts of this document. The inventor does not waive or disclaim his rights to any invention or inventions disclosed in this specification merely by not describing such other invention or inventions in the claims.

In accordance with one aspect of the present invention, a member made of preferably an elastic and electrically conductive material is placed between the bus bar and the starter plate, or an insulated end plate according to the first alternative above, or the end plate itself, for an insulated end plate according to the second alternative above. One example of a suitable material is the material used for the GDL. It has the desired properties and is compatible with the environment of the cell stack, since it is used already elsewhere in the stack and for a different purpose. However, the invention is not limited to the use of this particular material and could include numerous other alternatives with the requisite thickness, compression characteristics, fuel cell compatibility and electrical conductivity.

The recess for the bus bar may, as described above, be provided in the insulator plate, in the end plate or in the starter plate. Alternatively, the recess may be formed by cooperating recess halves provided in both the insulator plate/end plate as well as the starter plate. Shear stresses may be produced in at least the starter plate during compression of the stack. If the starter plate cracks, the shear stresses may propagate to other plates of the stack and cause further cracking of plates.

In accordance with one aspect of the present invention, there is provided an electrochemical cell stack comprising: a bus bar having a first side surface and a second side surface opposite the first side surface; an insulator end plate arranged on the first side of the bus bar; a starter plate arranged on the second side surface of the bus bar; and an elastic, electrically conducting member arranged between the second side surface of the bus bar and the starter plate. The elastic, electrically conducting member may cover at least a peripheral region along a perimeter of the bus bar. The elastic, electrically conducting member may distribute compression forces over an interface area between the bus bar and the insulator end plate to reduce shear stresses imposed on the starter plate at the interface area.

A recess may be arranged on at least one of the insulator end plate and the starter plate, the bus bar is at least partly arranged in the recess and an elastic, electrically conducting member covers at least a peripheral region along a perimeter of the recess, to distribute compression forces over an interface area between the bus bar and the insulator end plate, and reduce shear stresses imposed on the starter plate around the interface area.

The recess may be arranged in the insulator end plate and an elastic pad arranged in the recess and between the insulator end plate and the bus bar, to position the bus bar relative the insulator end plate. The elastic pad does not have to be electrically conductive; in fact, it is advantageous if it is electrically insulating similar to the insulator end plate.

In accordance with a further aspect of the present invention, there is provided an electrochemical cell stack comprising: an elongated flat bus bar having two opposite generally flat side surfaces; an end plate having a recess on one side, the recess arranged to receive the bus bar so that one of the two opposite generally flat side surfaces of the bus bar is received into the recess, the end plate having a substantially flat sealing area generally surrounding the recess; and an elastic material arranged on the other of the two opposite generally flat side surfaces of the bus bar, the elastic material extending from the bus bar to the sealing area of the end plate.

The end plate may further comprise manifold through holes arranged around a periphery of the recess. A sealing material may be arranged on the end plate to provide a seal around at least one of the manifold through holes.

A starter plate may also be provided having a first flat side surface and a second flat side opposite the first flat side, with the first flat side of the starter plate arranged to abut the other of the two opposite generally flat side surfaces of the bus bar. A sealing material may also be arranged on the second flat side of the starter plate to provide a seal around at least one of the manifold through holes.

Further, an elastic pad may be arranged in the recess of the end plate and between the recess and the bus bar.

BRIEF DESCRIPTION OF THE DRAWINGS

For a better understanding of the present invention and to show more clearly how it may be carried into effect, reference will now be made, by way of example, to the accompanying drawings which show, by way of example, one or more embodiments of the present invention and in which:

FIG. 2B is a perspective view illustrating an assembled fuel cell system (stack) according to the present invention;

FIG. 8B is a top view illustrating an insulating plate, with a bus bar in the recess, mounted on an end plate and a seal arranged on the insulator plate.

DETAILED DESCRIPTION

Various apparatuses or methods will be described below to provide an example of an embodiment of each claimed invention. No embodiment described below limits any claimed invention and any claimed invention may cover apparatuses or methods that are not described below. The claimed inventions are not limited to apparatuses or methods having all of the features of any one apparatus or method described below or to features common to multiple or all of the apparatuses described below. It is possible that an apparatus or method described below is not an embodiment of any claimed invention. The applicant(s), inventor(s) and/or owner(s) reserve all rights in any invention disclosed in an apparatus or method described below that is not claimed in this document and do not abandon, disclaim or dedicate to the public any such invention by its disclosure in this document.

Figure 1:
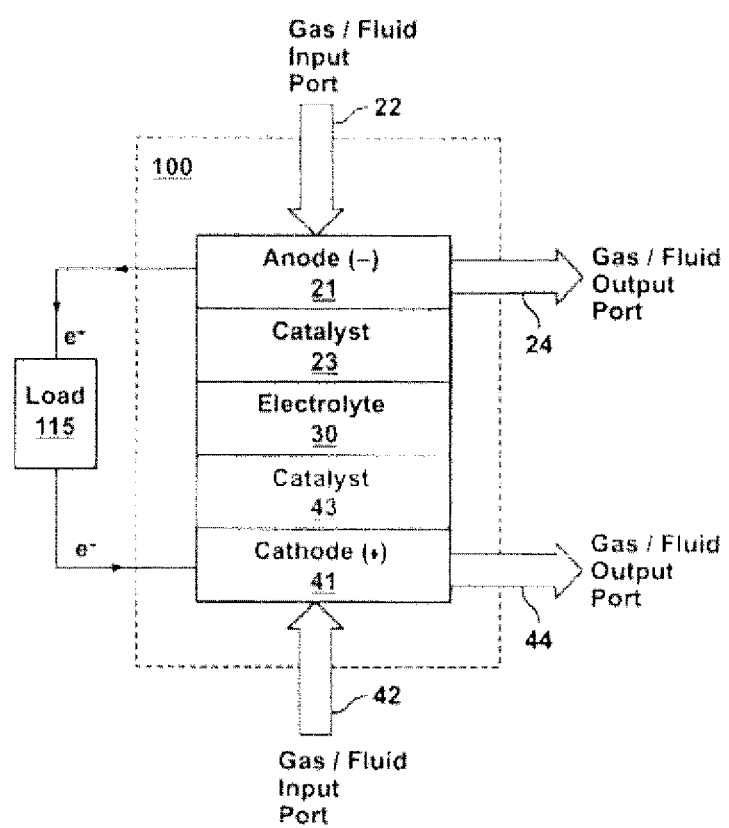
FIG. 1 is a schematic diagram illustrating a fuel cell system according to the present invention.

FIG. 1, shown is a simplified schematic graph of a Proton Exchange Membrane (PEM) fuel cell module, simply referred to as fuel cell module 100 hereinafter, that is described herein to illustrate some general considerations relating to the operation of electrochemical cell modules. It is to be understood that the present invention is applicable to various configurations of fuel cell modules that include one or more fuel cells.

The fuel cell module 100 includes an anode electrode 21 and a cathode electrode 41. The anode electrode 21 includes a gas input port 22 and a gas output port 24. Similarly, the cathode electrode 41 includes a gas input port 42 and a gas output port 44. An electrolyte membrane 30 is arranged between the anode electrode 21 and the cathode electrode 41.

The fuel cell module 100 also includes a first catalyst layer 23 between the anode electrode 21 and the electrolyte membrane 30, and a second catalyst layer 43 between the cathode electrode 41 and the electrolyte membrane 30. In some embodiments the first and second catalyst layers 23, 43 are directly deposited on the anode and cathode electrodes 21, 41, respectively.

A load 115 is connectable between the anode electrode 21 and the cathode electrode 41.

In operation, hydrogen fuel is introduced into the anode electrode 21 via the gas input port 22 under some predetermined conditions. Examples of the predetermined conditions include, without limitation, factors such as flow rate, temperature, pressure, relative humidity and a mixture of the hydrogen with other gases. The hydrogen reacts electrochemically according to reaction (1), given above, in the presence of the electrolyte membrane 30 and the first catalyst layer 23.

The chemical products of reaction (1) are hydrogen ions (i.e. cations) and electrons. The hydrogen ions pass through the electrolyte membrane 30 to the cathode electrode 41 while the electrons are drawn through the load 115. Excess hydrogen (sometimes in combination with other gases and/or fluids) is drawn out through the gas output port 24.

Simultaneously an oxidant, such as oxygen in the ambient air, is introduced into the cathode electrode 41 via the gas input port 42 under some predetermined conditions. Examples of the predetermined conditions include, without limitation, factors such as flow rate, temperature, pressure, relative humidity and a mixture of the oxidant with other gases. The excess gases, including the excess oxidant and the generated water are drawn out of the cathode electrode 41 through the gas output port 44. As noted previously, in low-pressure fuel cell systems the oxygen is supplied via oxygen carrying ambient air that is urged into the fuel cell stack using air blowers (not shown).

The oxidant reacts electrochemically according to reaction (2), given above, in the presence of the electrolyte membrane 30 and the second catalyst layer 43.

The chemical product of reaction (2) is water. The electrons and the ionized hydrogen atoms, produced by reaction (1) in the anode electrode 21, are electrochemically consumed in reaction (2) in the cathode electrode 41. The electrochemical reactions (1) and (2) are complementary to one another and show that for each oxygen molecule (O2) that is electrochemically consumed two hydrogen molecules (H2) are electrochemically consumed.

The rate and pressure at which the reactants, hydrogen and oxygen, are delivered into the fuel cell module 100 effects the rate at which the reactions (1) and (2) occur. The reaction rates are also affected by the current demand of the load 115. As the current demand of the load 115 increases, the reactions rate for reactions (1) and (2) increases in an attempt to meet the current demand.

Figure 2A:
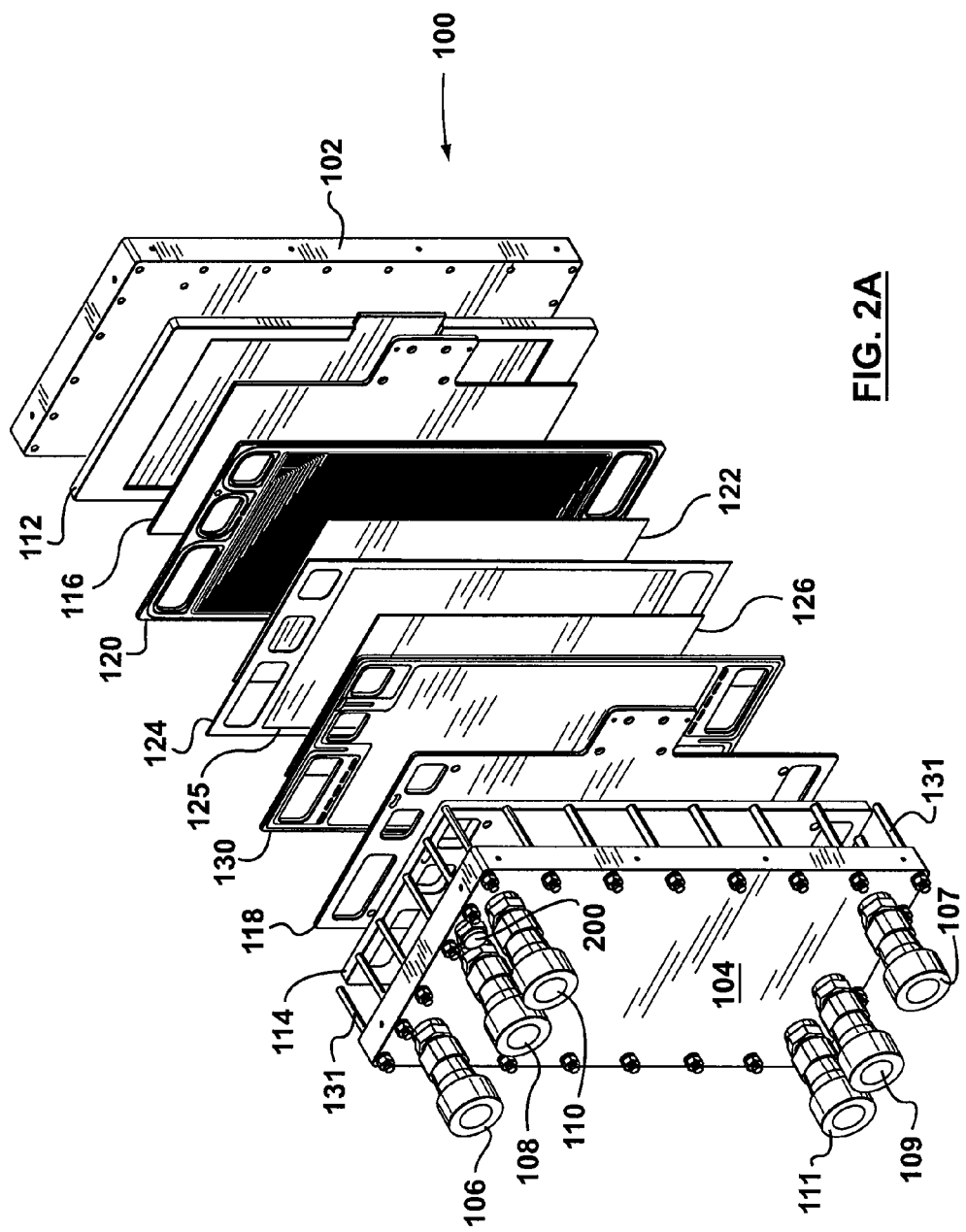
FIG. 2A is an exploded perspective view illustrating the fuel cell system according to the present invention.

FIG. 2A shows an exploded perspective view of a fuel cell stack 100 according to the present invention. It is to be understood that while a single fuel cell is detailed below, in known manner the fuel cell stack will usually comprise a plurality of fuel cells stacked together. Each fuel cell unit typically comprises an anode flow field plate 120, a cathode flow field plate 130, and a membrane electrode assembly (MEA) 124 disposed between the anode and cathode flow field plates 120, 130. Each reactant flow field plate has an inlet region, an outlet region, and open-faced channels to fluidly connect the inlet to the outlet, and provide a way for distributing the reactant gases to the outer surfaces of the MEA 124. The MEA 124 comprises a solid electrolyte (i.e. a proton exchange membrane) 125 disposed between an anode catalyst layer (not shown) and a cathode catalyst layer (not shown). A first gas diffusion media (GDM) 122 is disposed between the anode catalyst layer and the anode flow field plate 120, and a second GDM 126 is disposed between the cathode catalyst layer and the cathode flow field plate 130. The GDMs 122, 126 facilitate the diffusion of the reactant gas, either the fuel or oxidant, to the catalyst surfaces of the MEA 124. Furthermore, the GDMs enhance the electrical conductivity between each of the anode and cathode flow field plates 120, 130 and the membrane 125.

In a catalyzed reaction, a fuel, such as pure hydrogen, is oxidized at the anode catalyst layer of the MEA 124 to form protons and electrons. The proton exchange membrane 125 facilitates migration of the protons from the anode catalyst layer to the cathode catalyst layer. The electrons cannot pass through the proton exchange membrane 125, and are forced to flow through an external circuit (not shown), thus providing an electrical current. At the cathode catalyst layer of the MEA 124, oxygen reacts with electrons returned from the electrical circuit to form anions. The anions formed at the cathode catalyst layer of the MEA 124 react with the protons that have crossed the membrane 125 to form liquid water as the reaction product.

Still referring to FIG. 2A, hereinafter the designations "front" and "rear" with respect to the anode and cathode flow field plates 120, 130 indicate their orientation with respect to the MEA 124. Thus, the "front" face indicates the side facing towards the MEA 124, while the "rear" face indicates the side facing away from the MEA 124. A first current collector plate 116 abuts against the rear face of the anode flow field plate 120. Similarly, a second current collector plate 118 abuts against the rear face of the cathode flow field plate 130. The current collector plates 116, 118 collect the current from the flow field plates 120, 130, and are connected to an external electrical circuit (not shown). First and second insulator plates 112, 114 are located immediately adjacent the first and second current collector plates 116, 118, respectively. First and second end plates 102, 104 are located immediately adjacent the first and second insulator plates 112, 114, respectively. Pressure may be applied on the end plates 102, 104 to press the unit 100 together. Moreover, sealing means are usually provided between each pair of adjacent plates. Preferably, a plurality of tie rods 131 may also be provided. The tie rods 131 are screwed into threaded bores in the cathode endplate 104, and pass through corresponding plain bores in the anode endplate 102. In known manner, fastening means, such as nuts, bolts, washers and the like are provided for clamping together the fuel cell unit 100 and the entire fuel cell stack.

First end plate 102 is arranged at the dry end of the stack, i.e. no process fluid manifold openings are present in the first end plate and no process fluid transfer takes place via the first end plate. Second end plate 104 is arranged at the wet end of the stack where process fluid manifold openings are present in the second end plate and process fluid transfer takes place via the second end plate.

Still referring to FIG. 2A, the endplates 102, 104 are provided with a plurality of connection ports for the supply of various fluids. Specifically, the second endplate 104 has first and a second air connection ports 106, 107, first and second coolant connection ports 108, 109, and first and second hydrogen connection ports 110, 111. As will be understood by those skilled in the art, the MEA 124, the first and second gas diffusion media 122, 126, the anode and cathode flow field plates 120, 130, the first and second current collector plates 116, 118, the first and second insulator plates 112, 114, and the first and second end plates 102, 104 have three inlets near one end and three outlets near the opposite end thereof, which are in alignment to form fluid channels for air as an oxidant, a coolant, and hydrogen as a fuel. Also, it is not essential that all the outlets be located at one end, i.e., pairs of flows could be counter current as opposed to flowing in the same direction. Although not shown, it will be understood that the various ports 106-111 are fluidly connected to ducts that extend along the length of the fuel cell unit 100 and that are formed from apertures in individual flow field plates.

It will be understood by those skilled in the art that the coolant could be any known heat exchange fluid, including but not limited to water, deionized water, oil, ethylene glycol, and/or propylene glycol. While a variety of coolants could be used for the specific embodiments described herein, for simplicity, all the heat exchange fluids are deionized water in the described embodiments.

FIG. 2B shows an assembled fuel cell stack 100 according to a further embodiment of the invention. Multiple fuel cells are utilized as well as a different arrangement and number of tie rods. This does not affect the practice of the present invention.

Figure 3A:
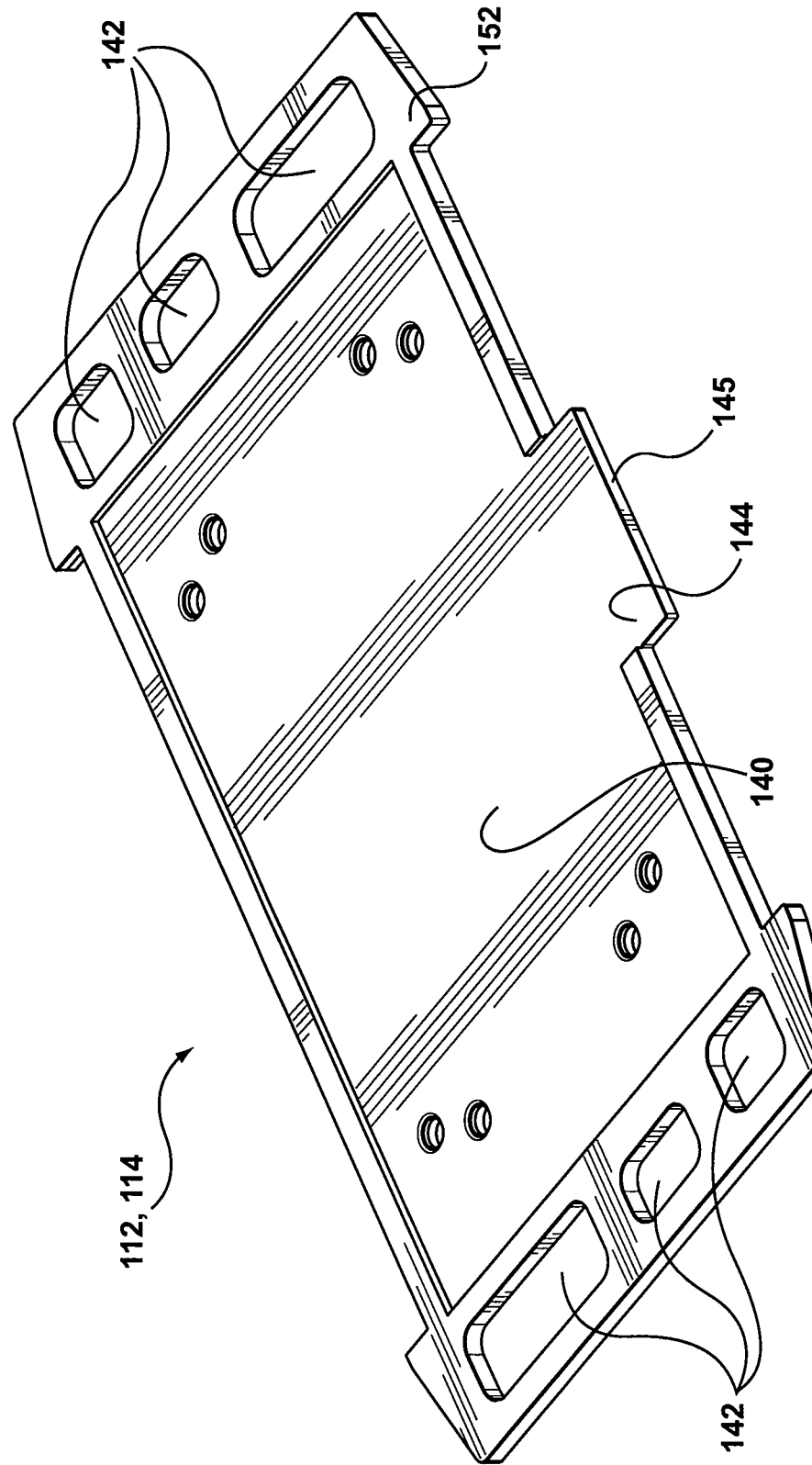
FIG. 3A is a perspective view illustrating an insulator plate according to the invention.
Figure 3B:
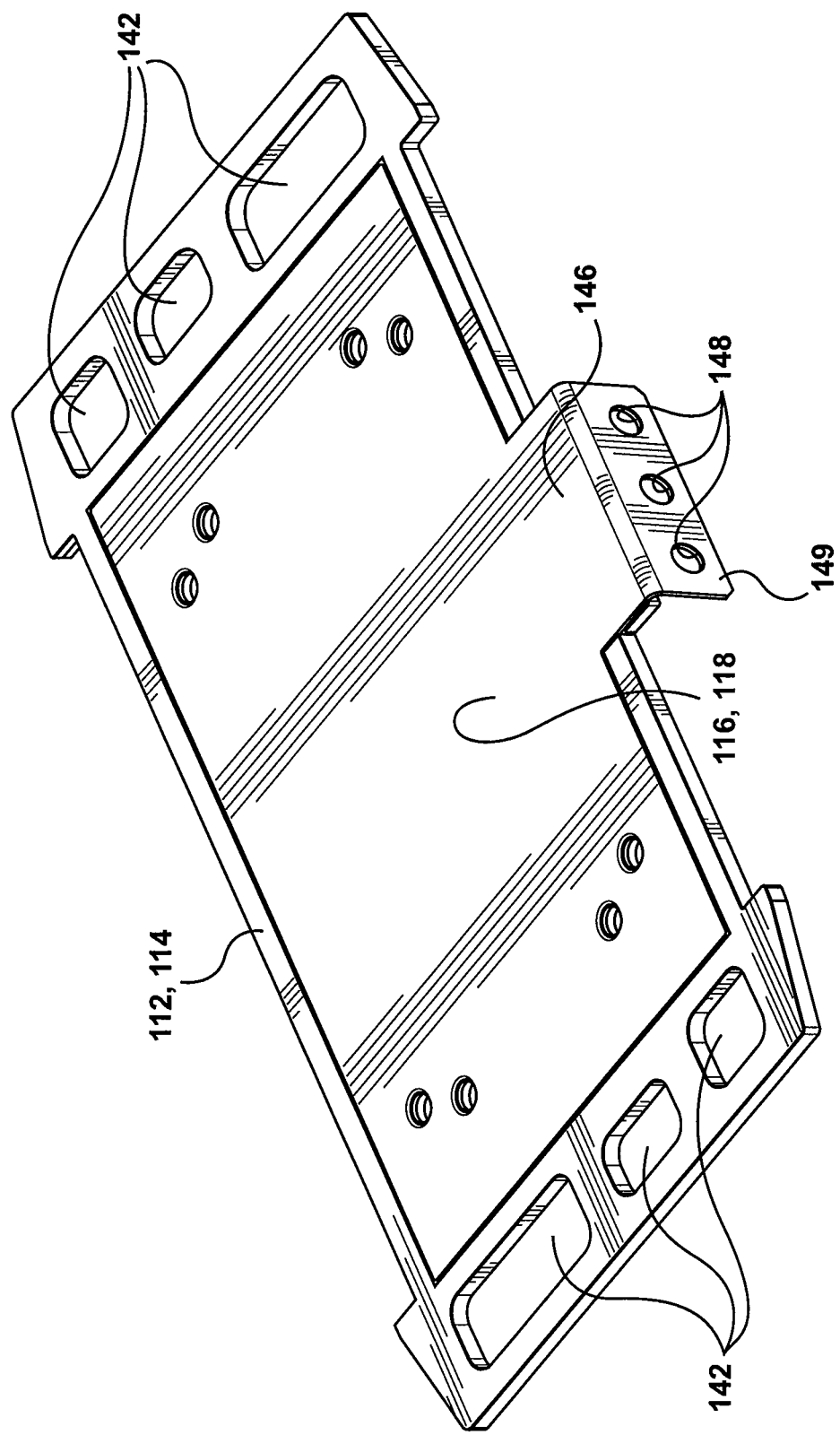
FIG. 3B is a perspective view illustrating the insulator plate as shown in FIG. 3A having a bus bar inserted into the insulator plate recess.

FIGS. 3A and 3B show an insulator plate 112, 114 according to one embodiment of the invention. As shown, the insulator plate 112, 114 may include holes (not marked) for assembly purposes. The insulator plate has a recess 140 for accommodating a bus bar 116, 118 (see FIG. 3B). The insulator plate 112, 114 also has manifold openings 142 arranged in a portion of the plate away from the recess 140. The manifold openings are used to provide fluid communication for process fluids such as fuel, oxidant and coolant fluids. Further, the insulator plate has a side cutout 144 for accommodating a tab 146 of the bus bar. The bus bar 116, 118 may have through holes 148 arranged in the tab 146, to facilitate attaching electrical connectors to the tab. The tab 146 may further have a bent portion 149 that is bent at a certain angle with respect to the rest of the bus bar. If the tab has the bent portion, the through holes 148 are arranged in the bent portion of the tab. The insulator plate may have an extension 145 protruding from the side cutout 144 to provide additional insulation for the bus bar tab 146 when the bus bar is mounted in the recess 140. The extension thus provides extra touch protection to prevent injury to an operator of the fuel cell system when the fuel cell system is operating and the bus bars are "live".

Figure 4A:
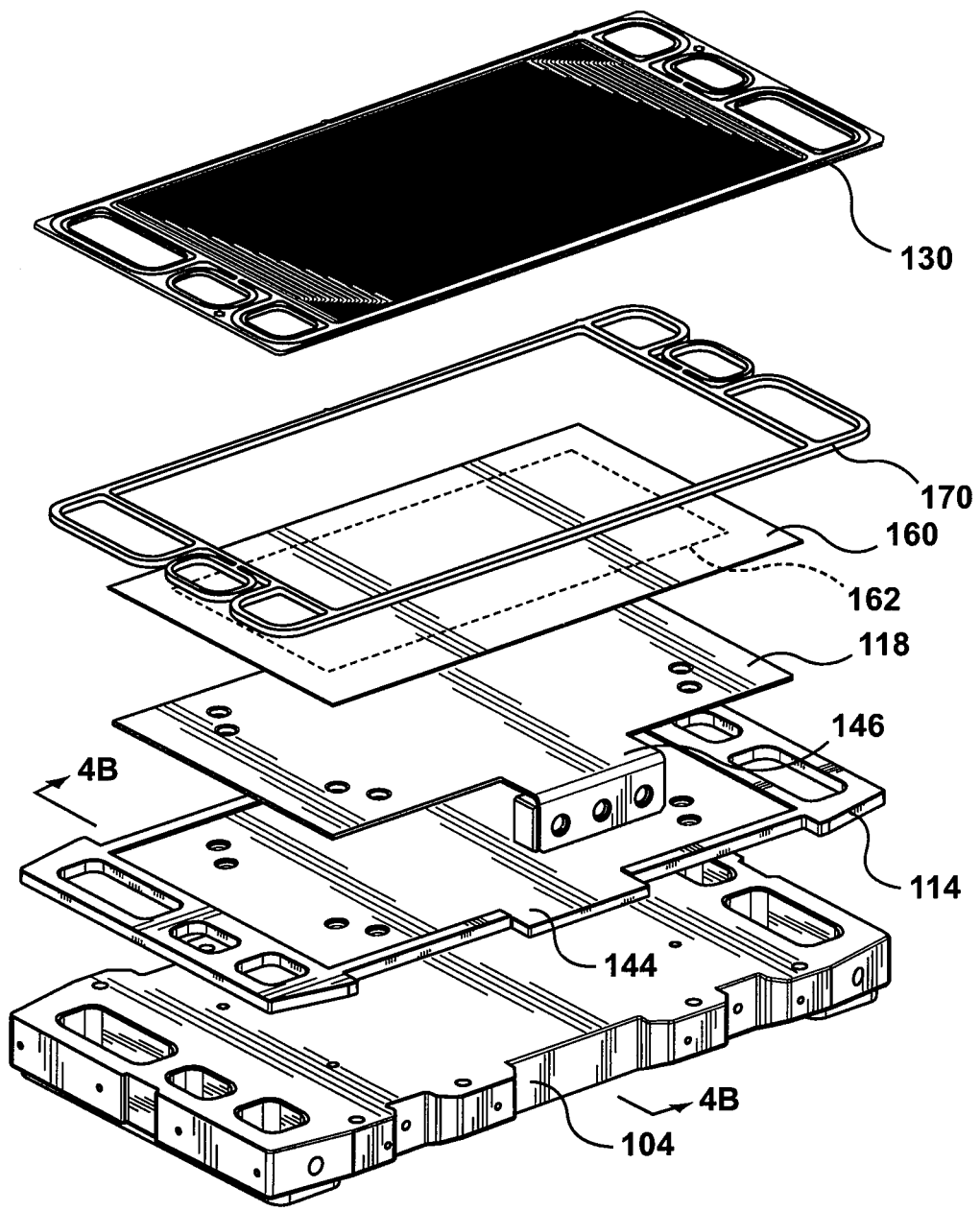
FIG. 4A is an exploded perspective view illustrating how an end plate, an insulator plate, an elastic member and a starter plate are assembled according to the present invention.
Figure 4B:
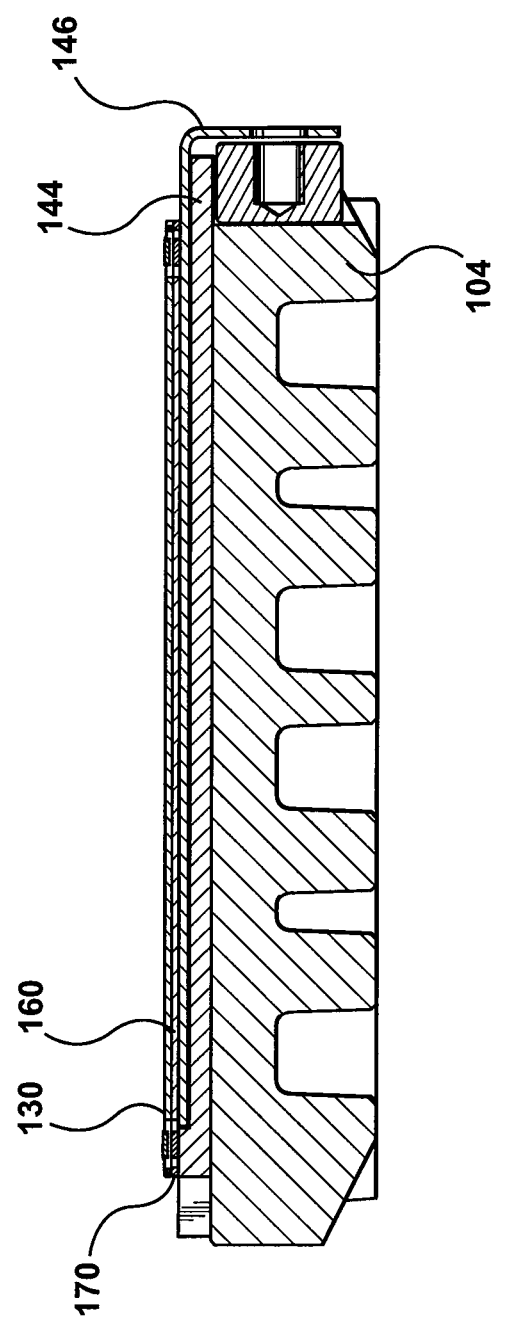
FIG. 4B is a sectional view illustrating the stack assembly shown in FIG. 4A.

Referring to FIGS. 4A and 4B, the insulator plate 114 receives a bus bar 118 having a protruding tab 146. The tab is received in the side cutout 144 of the insulator plate. A starter plate 130 is placed adjacent the bus bar 118. As shown in FIG. 3B, the tab 146 in the cutout 144 is flush with the surface of the insulator plate 114. A sealing member 170 is positioned in a groove (not shown) on the starter plate 130, as is known, to seal around the manifolds and around the edges of a flow field arranged on the starter plate 130. The seal 170 may also extend across the tab 146 of the bus bar. The flush arrangement of the tab 146 with the surface of the insulator plate 114 enables a continuous seal to be formed. The end plate 104 shown is from the wet end of the stack, but a similar arrangement is used for the dry end employing end plate 102, insulating plate 112, bus bar 116 and starter plate 120. This applies generally to FIGS. 4A, 4B, 5, 6 and 7A to 7D.

Figure 5:
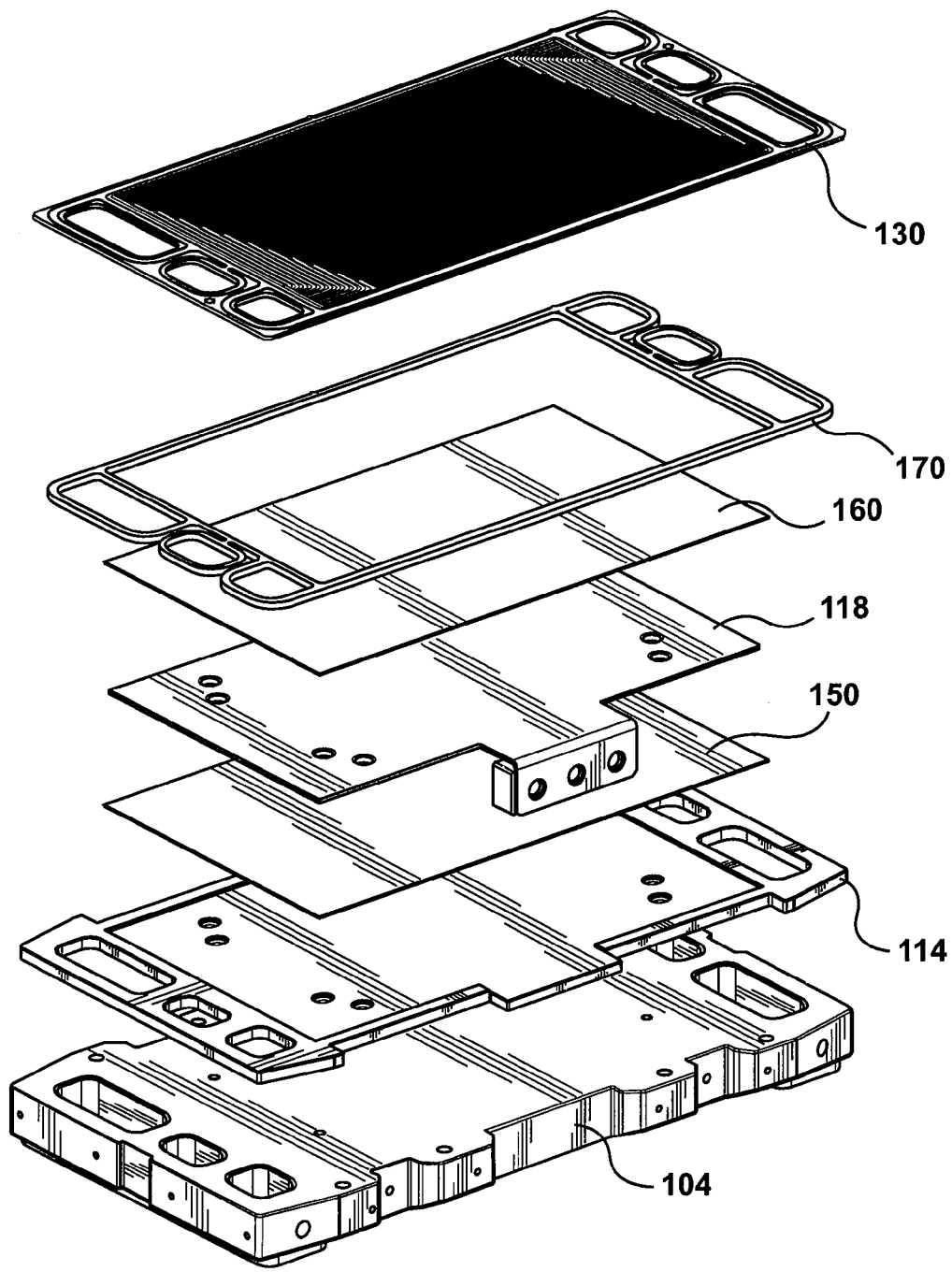
FIG. 5 is an exploded perspective view illustrating how an end plate, an elastic pad, an insulator plate, an elastic member and a starter plate are assembled according to the present invention.

The bus bar 118 may protrude a certain distance from an outer surface 152 of the insulator plate 114, after the cell stack has been compressed (clamped), in order for the bus bar 118 to make the desired electrical contact with the starter plate 130. In cases where the depth of the recess 140 is greater than the thickness of the bus bar 118, an elastic pad 150 may be placed in the recess before the bus bar (thus, between the insulator plate and the bus bar) so that the bus bar 118 protrudes the desired distance, as is shown in FIG. 5. The elastic pad 150 also may serve to absorb stress between the insulator plate 114 and the bus bar 118.

If the bus bar 118 does not protrude sufficiently from the recess 140, there will be insufficient electrical contact between the bus bar and the starter plate. On the other hand, if the bus bar protrudes too much there will be a risk of inducing shear stresses in the starter plate (and further flow field plates of the stack). The starter plates may be manufactured from materials such as graphite to provide formable materials that provide good electrical conductivity coupled with resistance to the environment in the stack. Most of the suitable material types are fairly resistant to compression forces but not so to shear forces (stresses). Given the relatively high compression forces applied to a typical stack, very small disparities in the heights of the bus bar 118 and recess 140 may result in shear stresses sufficient to cause the starter plate 130 to fail. In reality, it is difficult and thus costly to manufacture parts to the tolerances required to minimize the induced shear stresses mentioned earlier.

Figure 6:
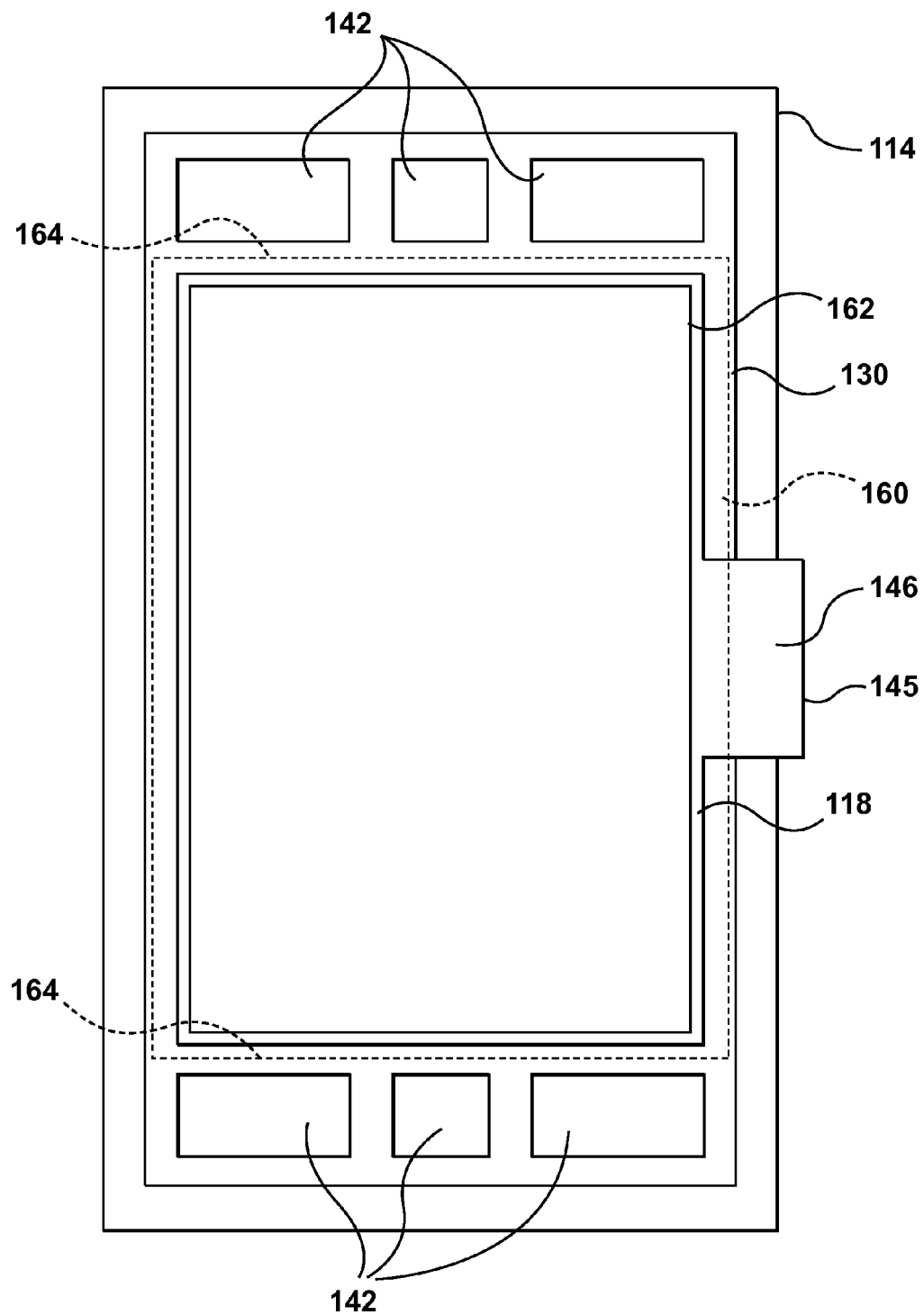
FIG. 6 is a plan view illustrating a section of the insulator plate/insulated end plate as received in the end plate and the positioning of the elastic member.

To minimize the shear stresses, a bus bar assembly according to the present invention is provided where an elastic, electrically conductive member 160 (referred to as an elastic member hereinafter) is positioned between the bus bar 118 and the starter plate 130 in such a way that the elastic member covers at least a perimeter region of the recess 140 of the insulator plate 114 and an outer circumference of the bus bar 118 (see FIG. 6). The elastic member 160 distributes compression forces to substantially absorb any differences in height in an interface area between the bus bar 118 and the outer surface 152 of the insulator plate 112. By doing so, the elastic member 160 reduces shear stresses imposed on the starter plate 130 around the interface area between the bus bar 118 and the outer surface 152 of the insulator plate 112. The elastic member 160 may be manufactured from the same material used for the GDL material, for example, provided this material is not too thick. Generally speaking the GDL material is inexpensive and may provide predictable properties while under compression conditions.

The elastic member 160 will be compressed when the stack is clamped and even out any shear stresses created over a larger surface area of the interface between the bus bar/insulator plate and starter plate. In this way, the risk of cracking plates of the stack is greatly reduced, whilst still maintaining sufficient electrical conductivity between the stack components (especially the starter plate to bus bar interface). The elastic member 160 may be a full sheet (having a shape corresponding generally to the shape of the starter plate (and further flow field plates of the stack). Alternatively, a center portion cutout 162 may be provided so that the elastic member covers only the general area adjacent the perimeter of the recess 140. In FIG. 6, the outline (outer perimeter) of the bus bar (except the tab 146) is shown covered by the elastic member 160. In one embodiment of the invention, illustrated by line 164 in FIG. 6, an outer edge of the elastic member should not protrude further than to the seals (not shown) surrounding the manifolds 142. A separate sealing member (170, see FIG. 4A) is provided to seal around the manifold openings.

Figure 7A:
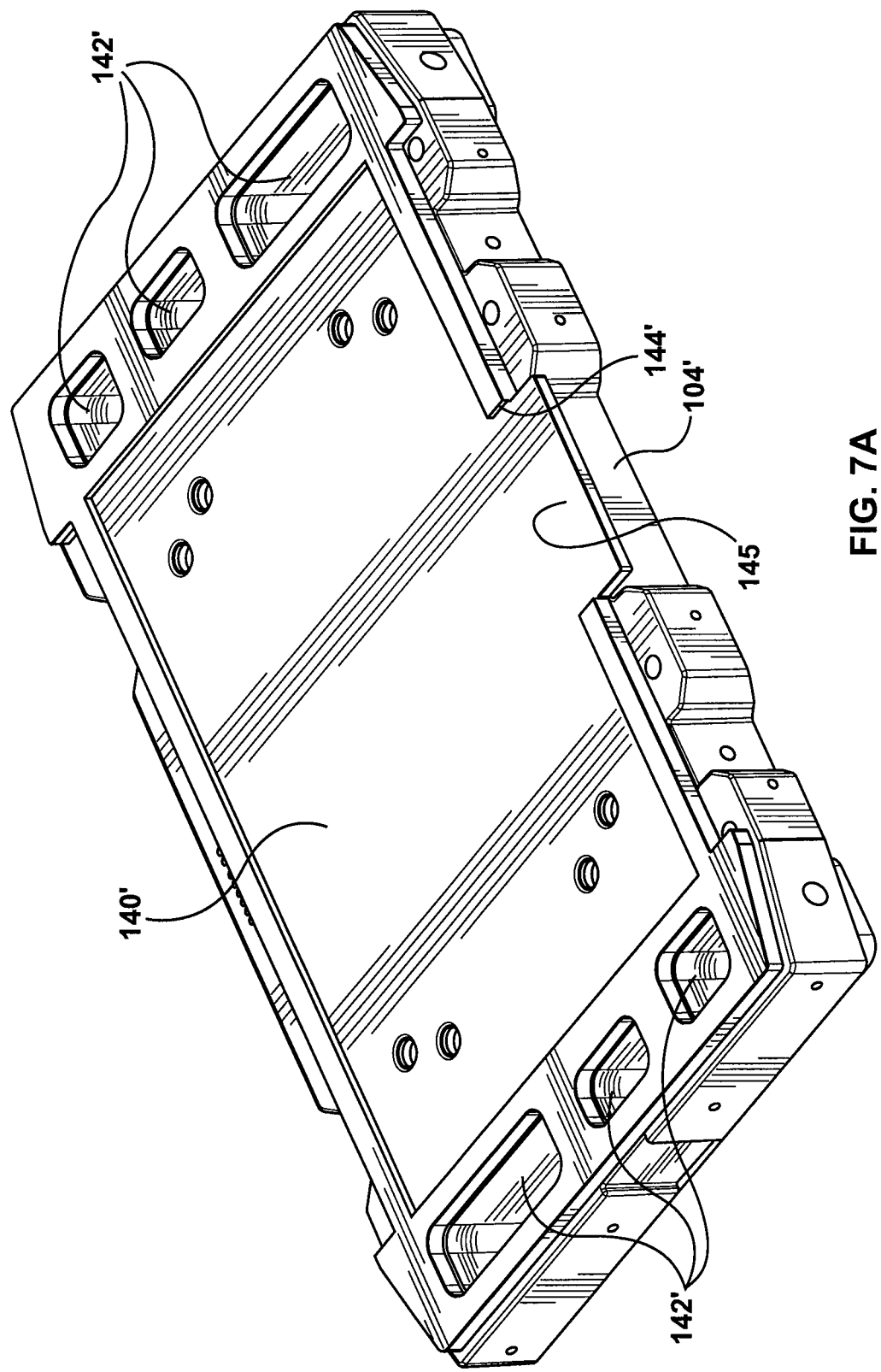
FIG. 7A is a perspective view illustrating an insulated end plate according to the present invention.
Figure 7B:
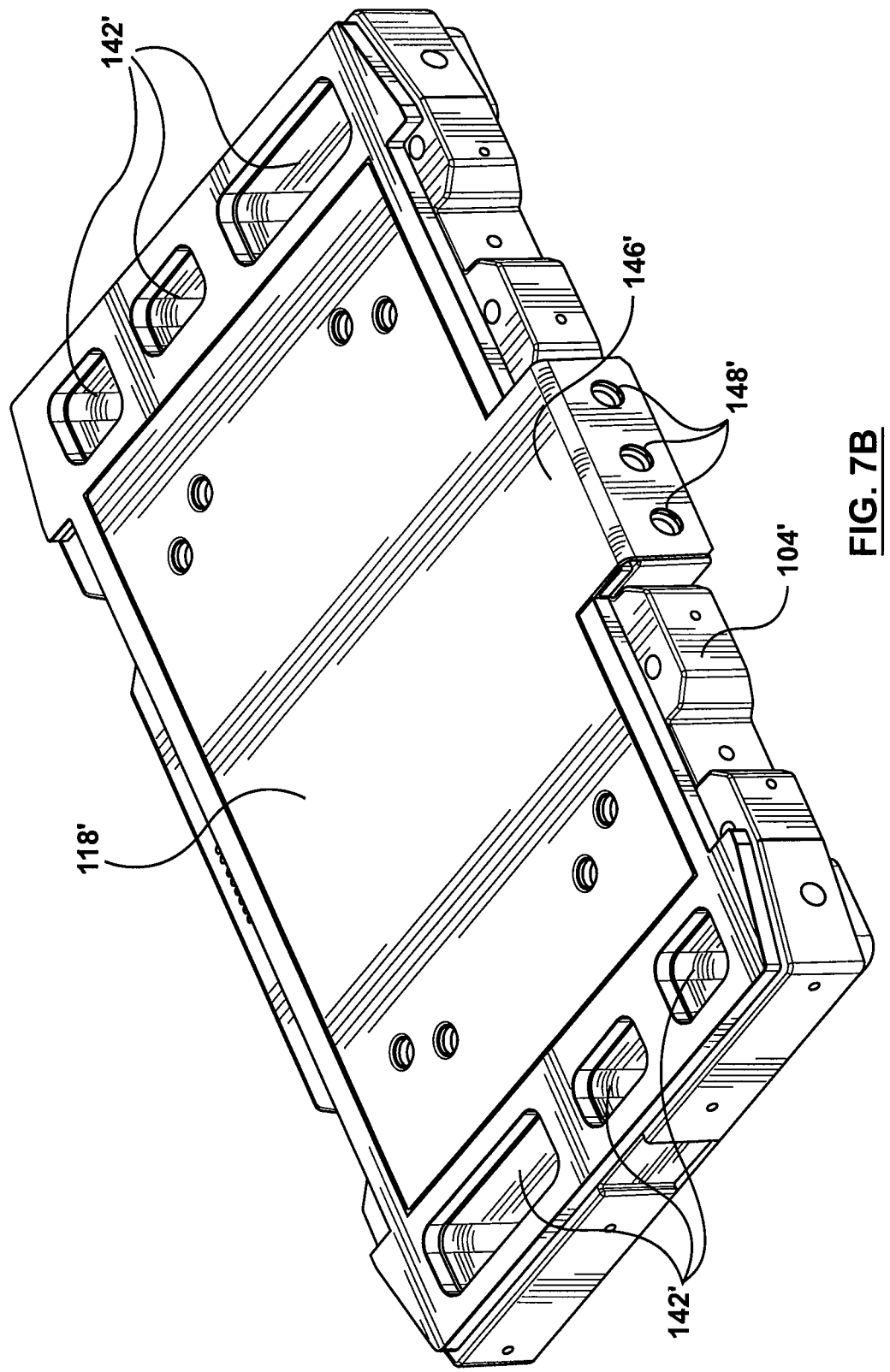
FIG. 7B is a perspective view illustrating how the insulated end plate shown in FIG. 6A receives a bus bar.
Figure 7C:
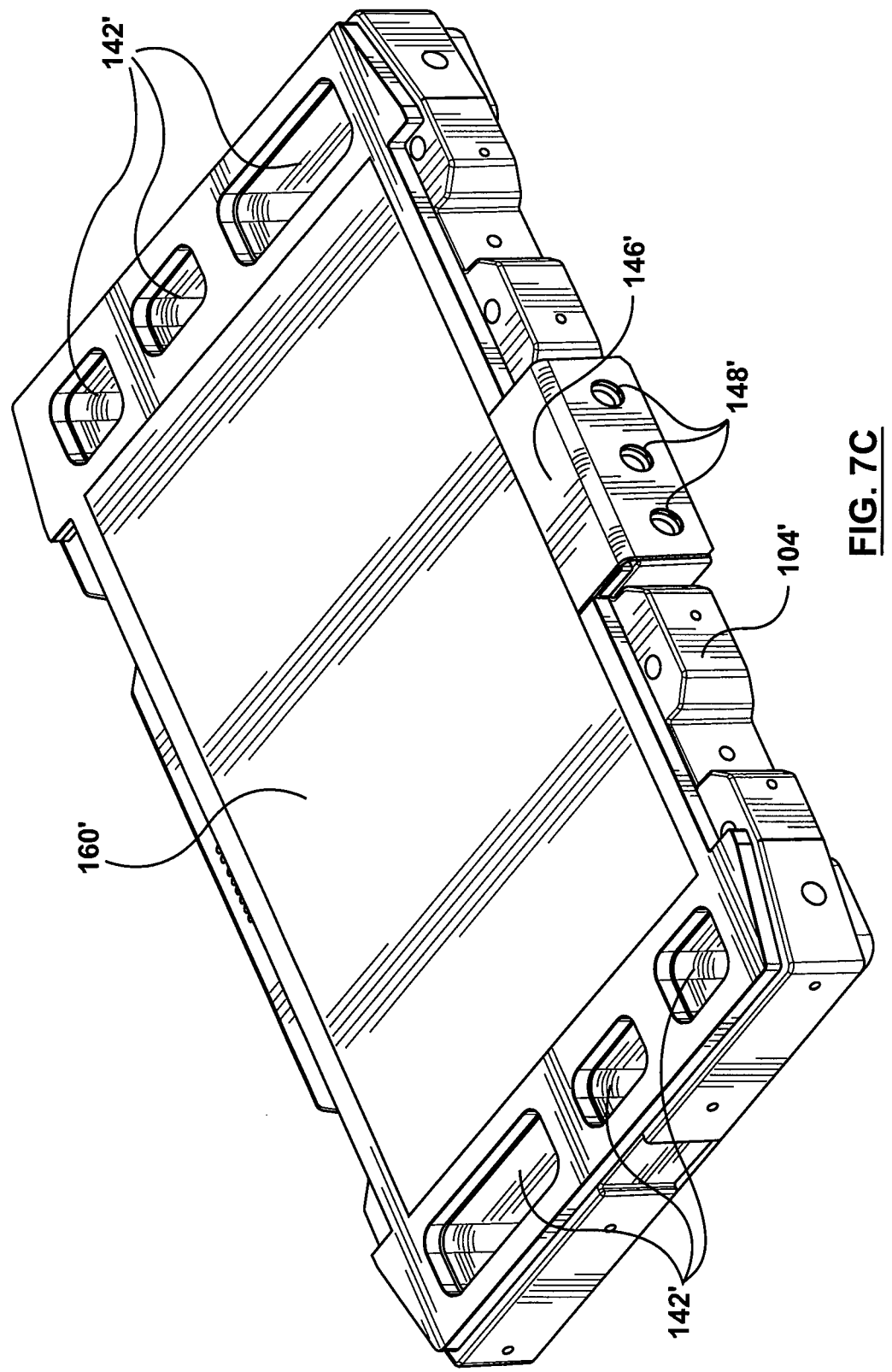
FIG. 7C is a perspective view illustrating how the insulated end plate/bus bar combination shown in FIG. 6B receives an elastic member.
Figure 7D:
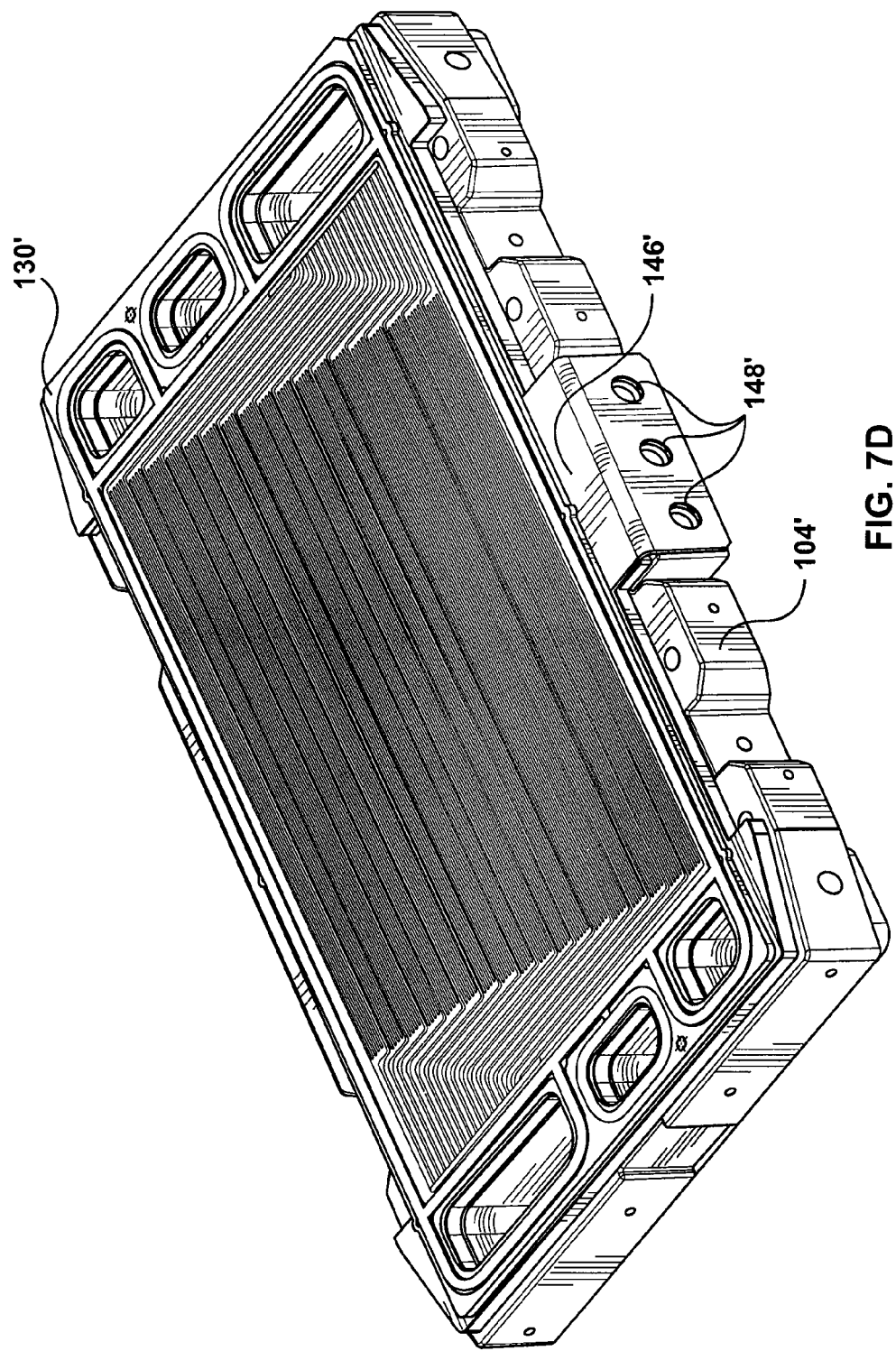
FIG. 7D is a perspective view illustrating how the insulated end plate/bus bar/elastic member combination shown in FIG. 6C receives a starter plate.

FIGS. 7A to 7D show a further embodiment of the invention, where the end plate and the insulator plate have been "combined" into one piece, an insulated end plate 104'. The insulated end plate has a recess 140' for accommodating the bus bar 116'. The insulated end plate 104' also has manifold openings 142' arranged in a portion of the plate away from the recess 140'. The manifold openings are used to provide fluid communication for process fluids such as fuel, oxidant and coolant fluids. Further, the insulated end plate has a side cutout 144' for accommodating the tab 146 of the bus bar. The insulated end plate 104' performs the same function as the insulator plate 112, 114 and end plate 102, 104 of the previously described embodiment of the invention. As is shown in FIG. 7B, the insulated end plate 104' receives the bus bar 118' having a protruding tab 146'. The tab is received in the side cutout 144' of the insulated end plate. The bus bar may have through holes 148' arranged in the tab 146, to facilitate attaching electrical connectors to the tab. An elastic member 160' is placed over the bus bar 118' (see FIG. 7C) and then a starter plate 130' is placed adjacent the bus bar 116', as is shown in FIG. 7D. Similar to the previously described embodiment of the invention, the end plate 104' is the wet end plate. There is also an end plate for the dry end of the stack, this end plate is without manifold openings. The dry end arrangement is not shown.

Figure 8A:
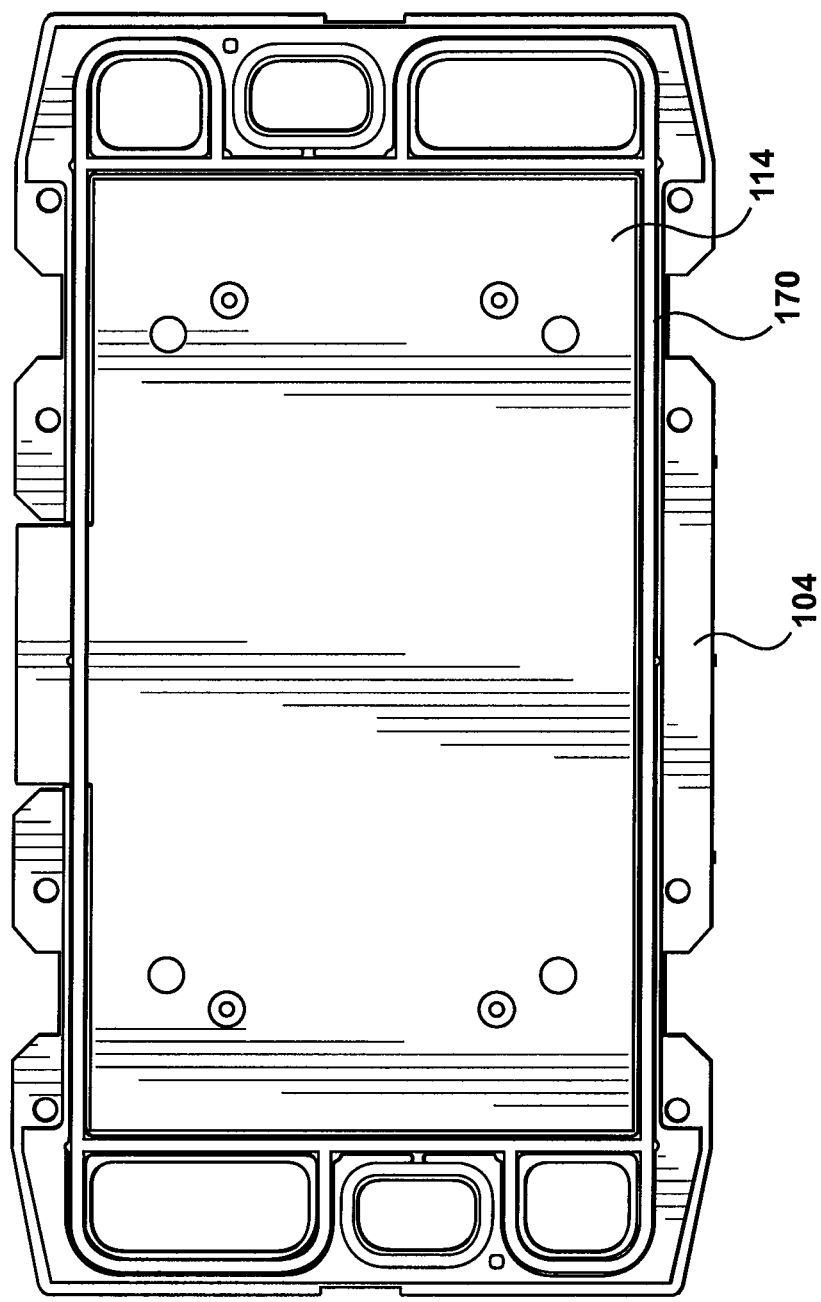
FIG. 8A is a top view illustrating an insulating plate mounted on an end plate and a seal arranged on the insulator plate.
Figure 8C:
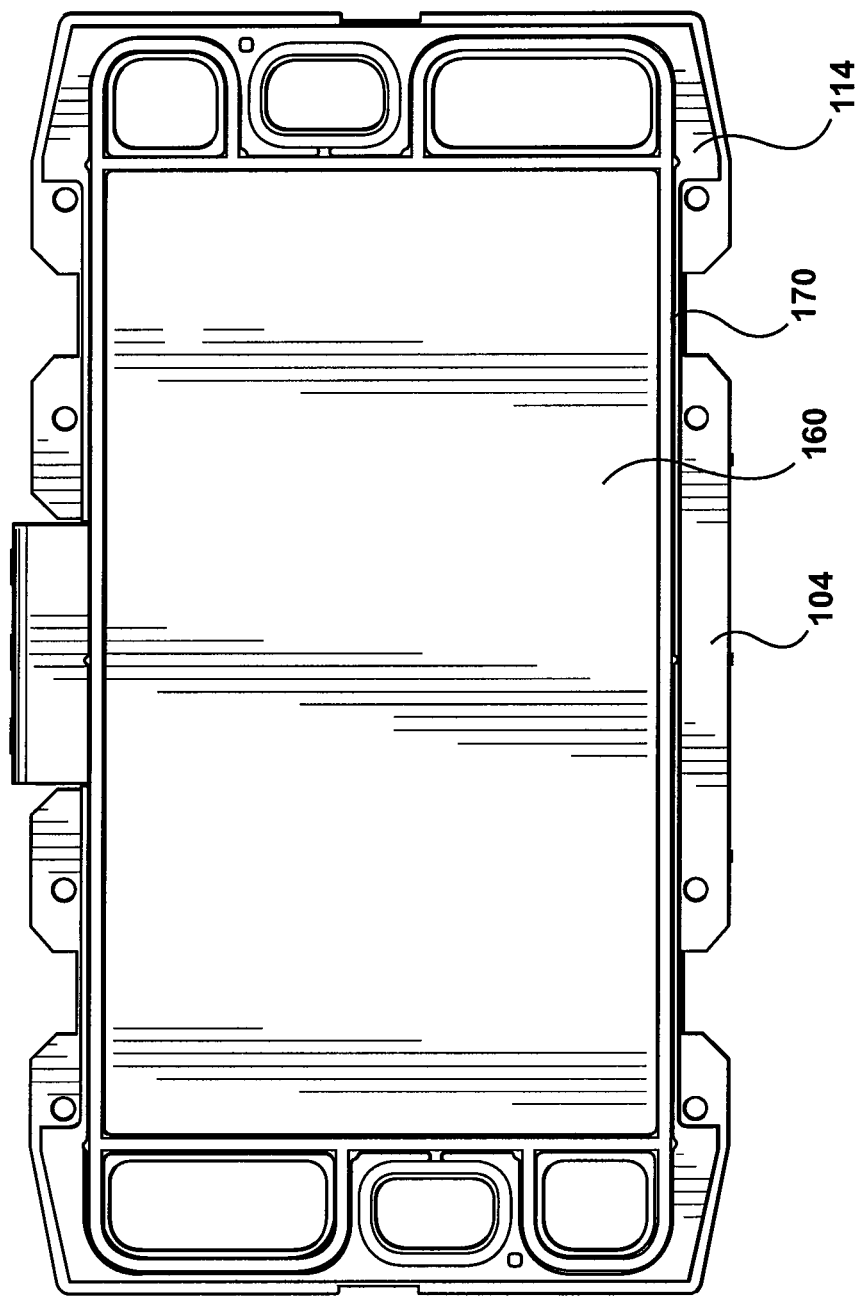
FIG. 8C is a top view illustrating an insulating plate, with a bus bar in the recess, mounted on an end plate and a seal arranged on the insulator plate, and the elastic member arranged on the bus bar/insulator plate.

FIGS. 8A to 8C show top views of an end plate/insulator plate arrangement similar to what is shown in FIGS. 4 and 5. The end plate 104 receives an insulator plate 114 and the sealing member 170 is placed on the insulator plate (FIG. 8A). In FIG. 8B, the bus bar 118 has been placed in the recess (not shown) of the insulator plate 114, and then the sealing member is placed on the insulator plate. Finally, as is shown in FIG. 8C, the elastic member 160 is placed on the bus bar/insulator plate.

It should be appreciated that the spirit of the present invention is concerned with minimizing the shear stresses in an electrochemical cell stack. The type and internal structure of the fuel cell stack as described does not affect the design of the present invention. In other words, the present invention is applicable to various types of fuel cells, electrolyzers or other electrochemical cell systems. The position, number, size and pattern of the fuel cell stacks and peripheral devices are not necessarily identical as disclosed herein.

It is anticipated that those having ordinary skill in this art can make various modification to the embodiment disclosed herein after learning the teaching of the present invention. However, these modifications should be considered to fall under the protection scope of the invention as defined in the following claims.

The invention claimed is:
1. An electrochemical cell stack comprising:
   a) a bus bar having a first side surface, a second side surface opposite the first side surface and a tab for connection to electrical connectors, the tab protruding in a lateral direction perpendicular to a direction from the first side surface to the second side surface beyond an outer lateral perimeter of the bus bar;
   b) an insulator end plate arranged on the first side surface of the bus bar;
   c) a starter plate arranged on the second side surface of the bus bar;
   d) an elastic, electrically conducting member arranged between the second side surface of the bus bar and the starter plate and covering at least a peripheral region along a perimeter of the bus bar to extend across an interface between the bus bar and the insulator end plate; and
   e) a seal arranged between the insulator end plate and the starter plate,
   wherein a recess is arranged on the insulator end plate,
   wherein the bus bar is arranged in the recess,
   wherein the insulator end plate includes a side cutout providing a path between the recess and an outer lateral perimeter of the insulator end plate to accommodate the tab of the bus bar, wherein the tab is generally flush with an outer surface of the insulator end plate, and wherein the seal extends over the tab of the bus bar.

2. The electrochemical stack as recited in claim 1, wherein the elastic, electrically conducting member distributes compression forces over an interface area between the bus bar and the insulator end plate.

3. The electrochemical cell stack as recited in claim 2, wherein the elastic, electrically conducting member reduces shear stresses imposed on the starter plate at the interface area.

4. The electrochemical cell stack as recited in claim 1, wherein the elastic, electrically conducting member covers at least a peripheral region along a perimeter of the recess.

5. The electrochemical cell stack as recited in claim 4, wherein the elastic, electrically conducting member distributes compression forces over an interface area between the bus bar and the insulator end plate.

6. The electrochemical cell stack as recited in claim 5, wherein the elastic, electrically conducting member reduces shear stresses imposed on the starter plate around the interface area.

7. The electrochemical cell stack as recited in claim 1, wherein the recess is arranged in the insulator end plate.

8. The electrochemical cell stack as recited in claim 7, wherein an elastic pad is arranged in the recess and between the insulator end plate and the bus bar.

9. The electrochemical cell stack as recited in claim 8, wherein the elastic pad positions the bus bar relative the insulator end plate.

10. The electrochemical cell stack of claim 1 wherein the elastic, electrically conducting member is made of gas diffusion material.

11. An electrochemical cell stack comprising:
a) a bus bar having a first side surface, a second side surface opposite the first surface, and a tab for connection to electrical connectors, the tab protruding in a lateral direction perpendicular to a direction from the first side surface to the second side surface beyond an outer lateral perimeter of the bus bar;
b) an insulator end plate arranged on the first side surface of the bus bar and including a recess for the bus bar and a side cutout for the tab, the side cutout providing a path between the recess and an outer lateral perimeter of the insulator end plate;
c) a starter plate arranged on the second side surface of the bus bar;
d) an elastic, electrically conducting member arranged between the second side surface of the bus bar and the starter plate, and covering a perimeter region of the recess and the outer perimeter of the bus bar to extend across an interface between the bus bar and the insulator end plate; and
e) a seal provided between the insulator end plate and the starter plate, wherein the side cutout is such that with the bus bar accommodated in the recess and the tab of the bus bar located in the side cutout, the tab is generally flush with an outer surface of the insulator end plate, with the seal extending across the outer surface of the insulator end plate and the tab.

12. An electrochemical cell stack comprising:
a) a bus bar having a first side surface, a second side surface opposite the first side surface, and a tab for connection to electrical connectors, the tab protruding in a lateral direction perpendicular to a direction from the first side surface to the second side surface beyond an outer lateral perimeter of the bus bar;
b) an insulator end plate arranged on the first side surface of the bus bar, the insulator end plate including a recess accommodating the bus bar such that the tab of the bus bar is generally flush with an outer surface of the insulator end plate, the insulator end plate further including a side cutout providing a path between the recess and an outer lateral perimeter of the insulator end plate to accommodate the tab;
c) a starter plate arranged on the second side surface of the bus bar;
d) an elastic, electrically conducting member arranged between the second side surface of the bus bar and the starter plate, the elastic, electrically conducting member covering a perimeter region of the recess and the outer perimeter of the bus bar to extend across an interface between the bus bar and the insulator end plate; and
e) a seal arranged between the insulator end plate and the starter plate, the seal extending across the outer surface of the insulator end plate and the tab.

13. The electrochemical cell stack as recited in claim 12, wherein the elastic, electrically conducting member distributes compression forces over an interface area between the bus bar and the insulator end plate.

14. The electrochemical cell stack as recited in claim 13, wherein the elastic, electrically conducting member reduces shear stresses imposed on the starter plate at the interface area.

15. The electrochemical cell stack as recited in claim 12, wherein an outer edge of the elastic, electrically conducting member does not protrude further than the seal.

* * * * *